United States Patent
Netsch et al.

(10) Patent No.: US 8,700,410 B2
(45) Date of Patent: Apr. 15, 2014

(54) METHOD AND SYSTEM FOR LOSSLESS VALUE-LOCATION ENCODING

(75) Inventors: Lorin Paul Netsch, Allen, TX (US); Jacek Piotr Stachurski, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 537 days.

(21) Appl. No.: 12/818,165

(22) Filed: Jun. 18, 2010

(65) Prior Publication Data

US 2010/0332238 A1 Dec. 30, 2010

Related U.S. Application Data

(60) Provisional application No. 61/218,307, filed on Jun. 18, 2009, provisional application No. 61/219,198, filed on Jun. 22, 2009, provisional application No. 61/219,868, filed on Jun. 24, 2009.

(51) Int. Cl.
*G10L 19/00* (2013.01)

(52) U.S. Cl.
USPC ........... 704/500; 704/200; 704/201; 704/229; 375/259

(58) Field of Classification Search
USPC ........................................ 704/500, 200–229
See application file for complete search history.

(56) References Cited

U.S. PATENT DOCUMENTS

| | | | | |
|---|---|---|---|---|
| 4,991,215 A * | 2/1991 | Taguchi | | 704/216 |
| 6,246,979 B1 * | 6/2001 | Carl | | 704/219 |
| 7,191,126 B2 * | 3/2007 | Tasaki | | 704/227 |
| 7,310,596 B2 * | 12/2007 | Ota et al. | | 704/201 |
| 7,389,227 B2 * | 6/2008 | Kang et al. | | 704/222 |
| 7,496,504 B2 * | 2/2009 | Lee et al. | | 704/219 |
| 8,190,425 B2 * | 5/2012 | Mehrotra et al. | | 704/203 |
| 8,290,782 B2 * | 10/2012 | Shmunk | | 704/500 |
| 2002/0157055 A1 * | 10/2002 | Coene et al. | | 714/758 |
| 2004/0032533 A1 * | 2/2004 | Correa et al. | | 348/618 |
| 2005/0065787 A1 * | 3/2005 | Stachurski | | 704/229 |
| 2005/0114123 A1 * | 5/2005 | Lukac et al. | | 704/222 |
| 2005/0220197 A1 * | 10/2005 | Noda | | 375/259 |
| 2007/0136049 A1 * | 6/2007 | Tasaki | | 704/201 |
| 2008/0215317 A1 * | 9/2008 | Fejzo | | 704/217 |
| 2008/0228500 A1 * | 9/2008 | Oh et al. | | 704/500 |
| 2009/0319261 A1 * | 12/2009 | Gupta et al. | | 704/207 |

(Continued)

OTHER PUBLICATIONS

Jacek Stachurski, Lorin Netsch: Fractional-bit and value-location lossless encoding in G.711.0 coder. ICASSP 2010: 4666-4669.*

(Continued)

*Primary Examiner* — Pierre-Louis Desir
*Assistant Examiner* — Fariba Sirjani
(74) *Attorney, Agent, or Firm* — Mima Abyad; W. James Brady; Frederick J. Telecky, Jr.

(57) ABSTRACT

A method of encoding samples in a digital signal is provided that includes receiving a frame of N samples of the digital signal, determining L possible distinct data values in the N samples, determining a reference data value in the L possible distinct data values and a coding order of L−1 remaining possible distinct data values, wherein each of the L−1 remaining possible distinct data values is mapped to a position in the coding order, decomposing the N samples into L−1 coding vectors based on the coding order, wherein each coding vector identifies the locations of one of the L−1 remaining possible distinct data values in the N samples, and encoding the L−1 coding vectors.

17 Claims, 5 Drawing Sheets

(56) References Cited

U.S. PATENT DOCUMENTS

| | | | | |
|---|---|---|---|---|
| 2009/0319263 | A1* | 12/2009 | Gupta et al. | 704/229 |
| 2010/0075606 | A1* | 3/2010 | Hargreaves | 455/41.3 |
| 2010/0082337 | A1* | 4/2010 | Sato et al. | 704/219 |
| 2010/0228551 | A1* | 9/2010 | Ragot et al. | 704/500 |
| 2010/0324913 | A1* | 12/2010 | Stachurski et al. | 704/500 |
| 2010/0324914 | A1* | 12/2010 | Stachurski et al. | 704/500 |
| 2010/0332238 | A1* | 12/2010 | Netsch et al. | 704/500 |
| 2011/0026591 | A1* | 2/2011 | Bauza et al. | 375/240.12 |
| 2011/0035212 | A1* | 2/2011 | Briand et al. | 704/203 |
| 2011/0093275 | A1* | 4/2011 | Li | 704/500 |

OTHER PUBLICATIONS

"Lossless Compression of G.711 Pulse Code Modulation", ITU-T Telecommunication Standardization Sector of ITU, Series G: Transmission Systems and Media, Digital Systems and Networks, Digital terminal equipments—Coding of voice and audio signals, Recommendation ITU-T G.711.0, Sep. 2009, pp. 1-72.

Solomon W. Golomb, "Run-Length Encodings", IEEE Transactions on Information Theory, Jul. 1966, vol. 12, Issue 3, pp. 399-401.

Robert F. Rice, "Some Practical Universal Noiseless Coding Techniques", JPL Publication 79-22, Mar. 15, 1979, National Aeronautics and Space Administration, Pasadena, CA, pp. 1-130.

Jacek P. Stachurski, et al., "Method and System for Block Adaptive Fractional-Bit Per Sample Coding", U.S. Appl. No. 12/818,164, filed Jun. 18, 2010, pp. 1-24.

Jacek P. Stachurski and Lorin P. Netsch, "Adaptive Encoding of a Digital Signal with One or More Missing Values", U.S. Appl. No. 12/818,166, filed Jun. 18, 2010, pp. 1-22.

* cited by examiner

METHOD AND SYSTEM FOR LOSSLESS VALUE-LOCATION ENCODING

CROSS-REFERENCE TO RELATED APPLICATIONS

This application claims benefit of U.S. Provisional Patent Application Ser. No. 61/218,307, filed Jun. 18, 2009, U.S. Provisional Patent Application Ser. No. 61/219,198, filed Jun. 22, 2009, and U.S. Provisional Patent Application Ser. No. 61/219,868, filed Jun. 24, 2009, which are incorporated herein by reference in their entirety.

BACKGROUND OF THE INVENTION

In many signal processing applications, it is desirable to transmit and/or store a digitized signal such that the exact original signal may be recovered. It is also desirable to reduce the number of bits needed to represent the signal in order to maximize the amount of data than can be handled during the transmission and/or storage process. Lossless compression techniques may be used to achieve this goal. Many techniques exist for lossless compression including Huffman coding, run-length coding, and predictive coding. Each of these coding techniques may provide comparatively better compression for certain classes of signals. However, improvements in lossless compression of digital signals are desirable.

Further, in many cases, digital signals to be encoded and transmitted include one predominant sample value, with sparse excursions to a few other sample values. For example, background noise in digital audio signals will often have a few distinct sample values. Signals with this sample characteristic are often not conducive to efficient encoding by known encoding techniques, such as linear predictive coding. When data to be transmitted includes predominantly one sample value, with sparse excursions to a single additional sample value, a run-length coding technique may be used. However, if sparse excursions occur to more than one other value, the typical run-length coding techniques may not be efficient, since such techniques may be most effective in encoding digital signals having sequences of one predominant sample value with a single other sample value sparsely included.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1:
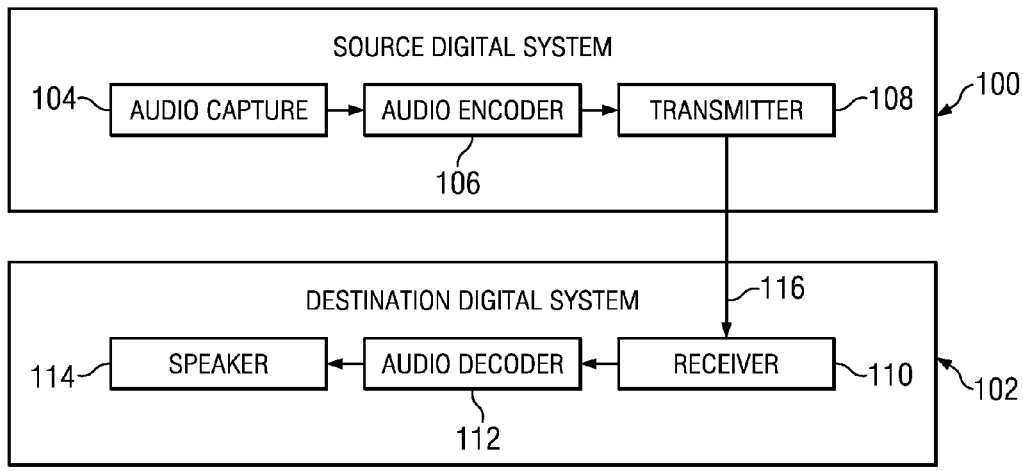
FIG. 1 shows a block diagram of a digital system in accordance with one or more embodiments of the invention.

Specific embodiments of the invention will now be described in detail with reference to the accompanying figures. Like elements in the various figures are denoted by like reference numerals for consistency.

Certain terms are used throughout the following description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. In addition, although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein. Further, while some embodiments of the invention are described herein in reference to the ITU-T G.711.0 standard and/or audio signals, one of ordinary skill in the art will understand that embodiments of the invention are not limited to any particular signal coding standard or type of signal. Recommendation ITU-T G.711.0 ("ITU-T G.711.0") as approved on Sep. 22, 2009 by ITU-T Study Group 16 is incorporated by reference herein in its entirety.

In general, embodiments of the invention provide for lossless value-location encoding of a digital signal in which the locations of occurrences of each possible distinct sample value in the digital signal are encoded. More specifically, in one or more embodiments of the invention, a frame of N samples with L possible distinct data values is decomposed into L−1 coding vectors where each coding vector represents the locations of one of L−1 of the possible distinct data values in the frame. The decomposition is performed by determining a reference data value in the L possible distinct data values, determining a coding order of the L−1 remaining possible distinct data values, and generating the L−1 coding vectors according to the coding order. Each of the coding vectors is then encoded in the order of generation and inserted into the output bit stream. Indicator(s) of the reference data value and the coding order may also be encoded and inserted in the output bit stream.

FIG. 1 shows a block diagram of a digital system in accordance with one or more embodiments of the invention. The digital system is configured to perform coding of digital audio sequences using embodiments of the methods described herein. The system includes a source digital system (100) that transmits encoded digital audio sequences to a destination digital system (102) via a communication channel (116). The source digital system (100) includes an audio capture component (104), an audio encoder component (106) and a transmitter component (108). The audio capture component (104) is configured to provide an audio sequence to be encoded by the audio encoder component (106). The audio capture component (104) may be, for example, a microphone, a speech synthesizer, an audio archive, or an audio feed from an audio content provider.

The audio encoder component (106) receives an audio sequence from the audio capture component (104) and encodes it for transmission by the transmitter component (108). In general, the audio encoder component (106) receives the audio sequence from the audio capture component (104) as a sequence of frames and encodes the audio data in each frame for transmission. During the encoding process, a method for lossless value-location encoding in accordance with one or more of the embodiments described herein may be used. The functionality of an embodiment of the audio encoder component (106) is described in more detail below in reference to FIG. 5.

The transmitter component (108) transmits the encoded audio data to the destination digital system (102) via the communication channel (116). The communication channel (116) may be any communication medium, or combination of communication media suitable for transmission of the encoded audio sequence, such as, for example, wired or wireless communication media, a local area network, and/or a wide area network.

The destination digital system (102) includes a receiver component (110), an audio decoder component (112) and a speaker component (114). The receiver component (110) receives the encoded audio data from the source digital system (100) via the communication channel (116) and provides the encoded audio data to the audio decoder component (112) for decoding. In general, the audio decoder component (112) reverses the encoding process performed by the audio encoder component (106) to reconstruct the frames of the audio sequence. The reconstructed audio sequence may then be reproduced by the speaker component (114). The speaker component (114) may be any suitable audio reproduction device.

In some embodiments of the invention, the source digital system (100) may also include a receiver component and an audio decoder component and/or the destination digital system (102) may include a transmitter component and an audio encoder component for transmission of audio sequences in both directions. Further, the audio encoder component (106) and the audio decoder component (112) may perform encoding and decoding in accordance with one or more audio compression standards such as, for example, ITU-T G.711 and G.711.0 standards. The audio encoder component (106) and the audio decoder component (112) may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc. Software implementing all or part of the audio encoder and/or audio decoder may be stored in a memory, e.g., internal and/or external ROM and/or RAM, and executed by a suitable instruction execution system, e.g., a microprocessor or DSP. Analog-to-digital converters and digital-to-analog converters may provide coupling to the real world, modulators and demodulators (plus antennas for air interfaces) may provide coupling for transmission waveforms, and packetizers may be included to provide formats for transmission.

Figure 2:
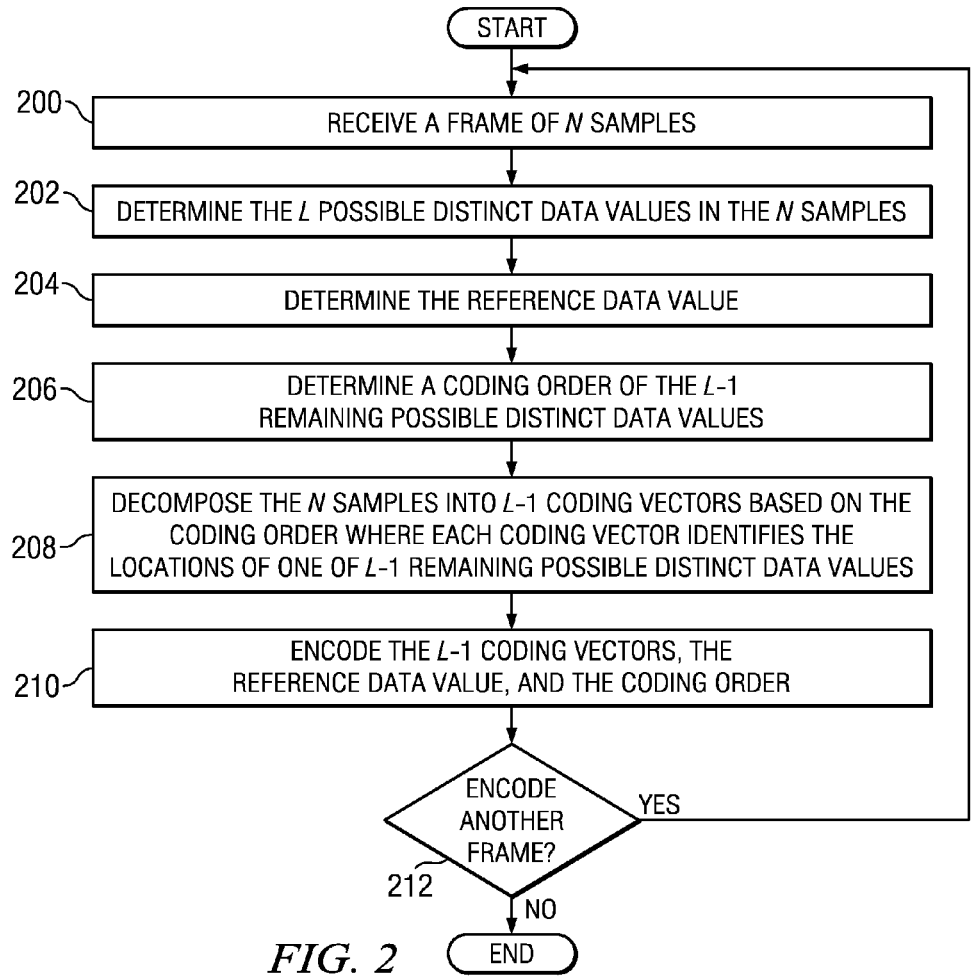
FIG. 2 shows a flow diagram of a method in accordance with one or more embodiments of the invention.

FIG. 2 shows a flow diagram of a method for lossless value-location coding of one or more frames of N samples in a digital signal in accordance with one or more embodiments of the invention. As shown in FIG. 2, initially, a frame of N samples, $I_0$ to $I_{N-1}$, of the digital signal is received (200). The value of N may be any suitable value. For example, N may be 40, 80, 160, 240, or 320.

Next, the L possible distinct data values that the N samples may be determined (202). The possible distinct data values in the N samples may be determined by finding the maximum sample value $I_{max}=\max\{I_n:n=0,\ldots N-1\}$ and the minimum sample value $I_{min}=\min\{I_n:n=0,\ldots N-1\}$ in the N samples. The possible distinct data values $\{i_l:l=0,\ldots L-1\}$ are then the range of data values from $I_{min}$ to $I_{max}$, i.e., $I_{min} \le i_l \le I_{max}$. The number of possible distinct data values L, i.e., the data value range, for the frame may be computed as the difference between the maximum and minimum values of the N samples in the frame, e.g., $L=I_{max}-I_{min}+1$. For example, if the actual distinct sample values in the frame are $\{-3, -2, 0, 1, 2\}$, then L=6, indicating that there are six possible distinct data values in the frame and the possible distinct data values are $\{-3, -2, -1, 0, 1, 2, 3\}$.

A reference data value $v_0$ is then determined from the possible distinct data values $i_l$ (204) and a coding order $\{v_k: k=1,\ldots,L-1\}$ of the L-1 remaining possible distinct data values is also determined (206). As is explained in more detail below, the reference data value $v_0$ and the coding order impact the decomposition of the N samples into coding vectors, and thus the overall coding efficiency. That is, the coding vectors, each of which represents locations of one of the L-1 remaining possible distinct data values in the N samples, are generated according to the coding order and this coding order may affect the content and length of the coding vectors. Further, as is explained in more detail below, the reference data value and coding order, unless fixed for all frames, are encoded in some fashion for communication to the decoder. The selection of the reference data value and the coding order affect how many bits are required for encoding.

The reference data value $v_0$ may be any one of the possible distinct data values $i_l$ and may be determined in any suitable way, e.g., a single empirically determined value, direct computation, table look-up, etc. For example, the reference data value $v_0$ may be the data value that occurs most frequently in the N samples, or, if the digital signal has certain characteristics, may be set to 0 for all frames. The coding order $\{v_k: k=1,\ldots,L-1\}$ of the L-1 remaining possible distinct data values may be also be determined in any suitable way. In general, the L-1 remaining possible distinct data values are mapped in some way to one of the $v_k$. For example, if the possible distinct data values are $\{-2,-1,0,1,2\}$ and the reference data value $v_0=0$, one possible coding order is $\{-1,1,-2,2\}$. The technique(s) for determining the reference data value $v_0$ and the coding order $v_k$ may be defined by a particular application, resources available, known signal characteristics, and/or performance required. Factors to be considered in the determination of the reference data value $v_0$ and the coding order $v_k$ are discussed below.

One possible way to determine the reference data value $v_0$ and/or the coding order $v_k$ is to calculate the compression obtained for each possible reference data value and/or coding order of the L-1 remaining possible data values and the corresponding coding vectors, and choose a reference data value and/or the coding order that provides the best compression. However, this requires computational resources that may not be available. In addition, this would require explicit encoding of the coding order. Another possible way to determine the reference data value $v_0$ and the coding order is to select the reference data value in some suitable way and then use a specific pre-determined coding order, for example from the minimum to the maximum data value of the remaining possible data values. This does not require the computational resources mentioned above, and does not require explicitly encoding the coding order. However, this approach may not provide the best overall compression performance. Another possible way to determine the reference data value $v_0$ and the coding order is to select the most frequently occurring data value in the N samples as the reference data value and to order the L−1 remaining possible data values in order of frequency of occurrence. This also does not require the computational resources of the initial approach but it does require explicitly encoding the reference data value and the coding order. Again, this approach may not provide the best overall compression performance.

In some embodiments of the invention, the reference data value $v_0$ is set to the data value that occurs most often in the N samples. The coding order $v_k$ of the L−1 remaining possible distinct data values is determined by comparing the total number of occurrences of actual distinct data values in the N samples above the reference value $v_0$, $N_A$, to the total number of occurrences of values below the reference value $v_0$, $N_B$. The L−1 possible distinct data values are mapped to the coding order $v_k$ by alternating above and below the reference data value $v_0$ as follows:

$$\begin{array}{ll} \text{if } N_A \geq N_B & \text{if } N_A < N_B \\ v_1 = v_0 + 1 & v_1 = v_0 - 1 \\ v_2 = v_0 - 1 & v_2 = v_0 + 1 \\ v_3 = v_0 + 2 & v_3 = v_0 - 2 \\ v_4 = v_0 - 2 & v_4 = v_0 + 2 \\ \vdots & \vdots \end{array}$$

Assignment above and below the reference value $v_0$ is done as long as data values are available for alternating; any remaining data values are then assigned to the remaining $v_k$.

Figure 3A:
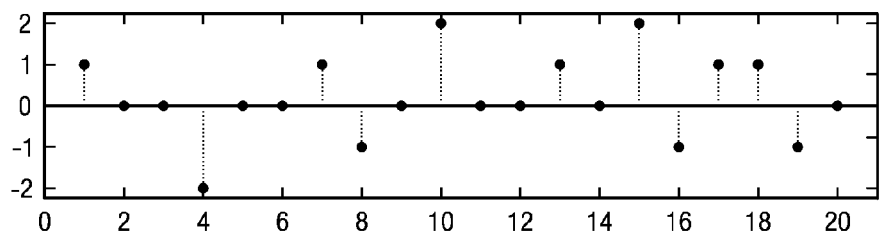
FIGS. 3A-3E and 4A-4D show examples in accordance with one or more embodiments of the invention.
Figure 3B:
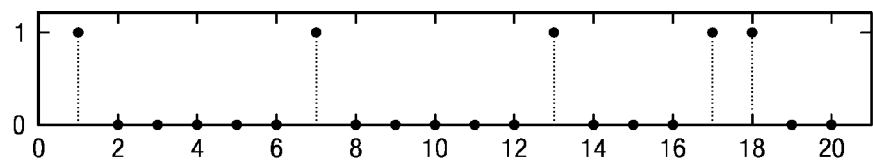

For example, consider the example signal of FIG. 3A. In this signal, N=20, L=5, and the possible distinct data values are {−2,−1,0,1,2}. The most frequently occurring data value is 0, so the reference data value $v_0$ is set to 0. Further, $N_A=7$ and $N_B=4$. Since $N_A > N_B$, the coding order will be {1,−1,2,−2}. If this approach for determining the reference data value $v_0$ and the coding order $v_k$ is used, the information to be encoded for the decoder is the reference data value $v_0$ and an indication of whether the first data value in the coding order is the data value above or below the reference value $v_0$, e.g., a single bit.

Referring again to FIG. 2, once the reference data value $v_0$ and the coding order are determined, the N samples are decomposed into L−1 coding vectors based on the coding order where each coding vector identifies the locations of one of the L−1 remaining possible data values, i.e., the locations of one of the $v_k$, in the N samples (208). In some embodiments of the invention, the N samples are first decomposed into L−1 interim coding vectors $c_k$ with a 1 at locations where the respective $v_k$ value occurs and a 0 in all other locations. The interim coding vectors $c_k$ are then processed to generate reduced-length coding vectors $z_k$.

More specifically, the N samples, denoted as s, may be decomposed as $$s = v_0 + \sum_{k=1}^{L-1} (v_k - v_0) c_k$$

where the interim coding vectors $c_k$ represent the locations of all values $v_k$ within the N samples. An interim coding vector $c_k$ contains 1 at the locations at which the value $v_k$ occurs, and 0 elsewhere. The number of occurrences of each $v_k$ value, $N_k$, equals the number of non-zero elements in the corresponding $c_k$ vector, $$N_k = \sum_{i=1}^{N} c_k(i),$$

with $$N_0 = N - \sum_{k=1}^{L-1} N_k.$$

To encode the N samples, it is sufficient to specify the number of possible data values L, the reference data value $v_0$, and the coding order $v_k$ with the corresponding interim coding vectors $c_k$.

FIGS. 3A-3E show an example of a digital signal decomposition into interim coding vectors $c_k$. In the original digital signal of FIG. 3A, N=20, L=5, and the possible distinct data values are {−2,−1,0,1,2}. For the decomposition, the reference value $v_0=0$, and the coding order is $v_1=1$, $v_2=-1$, $v_3=2$, and $v_4=-2$. The corresponding interim coding vectors $c_k$ are shown in FIGS. 3B-3E.

The interim coding vectors $c_k$ are then reduced in length to generate the coding vectors $z_k$. The approach to generating the coding vectors $z_k$ takes advantage of the fact that the interim coding vectors $c_k$ contain non-zero elements in unique locations, i.e., if $c_k(n)=1$
then $c_l(n)=0$ for all $l \neq k$ where n=1, ..., N. Using this property, once a given interim coding vector $c_k$ is reduced to a coding vector $z_k$, the elements corresponding to the $N_k$ non-zero $c_k$ locations need not be considered when reducing all subsequent interim encoding vectors $c_i$, i>k.

The coding vectors $z_k$ may be generated from the interim coding vectors $c_k$ as follows. Let $z_k$ denote a vector obtained from the code vector $c_k$ by removing elements corresponding to all non-zero-value locations in vectors $c_1, \ldots, c_{k-1}$ (or, equivalently, by preserving those elements corresponding to zero-value locations). The $D_k$ dimension (length) of a vector $z_k$ is given by $$D_k = N - \sum_{i=1}^{k-1} N_i, k = 2, \ldots, L-1.$$

Let vectors $\delta_k$ specify the non-zero-value and zero-value locations observed in the interim coding vectors $c_1, \ldots, c_k$, $$\delta_k(n) = \sum_{i=1}^{k} c_i(n), k = 1, \ldots, L-1.$$

Note that the vectors $\delta_k$ may be calculated recursively:

$\delta_1(n)=c_1(n)$ $\delta_k(n)=\delta_{k-1}(n)+c_k(n), k=2,\ldots,L-1.$

Further, let $z_1(n)=c_1(n), n=1,\ldots,N,$ with the $D_1$ dimension equal to N. The coding vectors $z_k$, k=2, ..., L−1, may be computed as follows:

set m=1
for each n=1, ..., N
  if $\delta_{k-1}(n)=0$
    then $z_k(m)=c_k(n)$ and m=m+1

Note that the coding vectors $z_k$, k=2, ..., L−1 are generated sequentially in the coding order. The resulting coding vectors $z_k$ are summarized in Table 1 below.

TABLE 1

| Coding vector | Number of elements | Description |
|---|---|---|
| $z_1$ | N | equivalent to $c_1$ |
| $z_2$ | N − $N_1$ | $c_2$ with elements corresponding to non-zero locations in $c_1$ removed |
| $z_3$ | N − $N_1$ − $N_2$ | $c_3$ with elements corresponding to non-zero locations in $c_1$ and $c_2$ removed |
| . | | |
| . | | |
| . | | |
| $z_{L-1}$ | $N - \sum_{i=1}^{L-2} N_i$ | $c_{L-1}$ with elements corresponding to non-zero locations in $c_1, \ldots, c_{L-2}$ removed |

Note that as elements are removed from the interim coding vectors $c_k$, the coding vectors become shorter with each processing step k which helps to improve coding efficiency. While the total number of elements in the interim coding vectors $c_k$ equals N(L−1), the total number of elements in coding vectors $z_k$ is reduced to $$\sum_{k=1}^{L-1}\left(N - \sum_{i=1}^{k-1} N_i\right) = N(L-1) - \sum_{k=1}^{L-2}\sum_{i=1}^{k} N_i,$$

i.e., reduced by $$\sum_{k=1}^{L-2}\sum_{i=1}^{k} N_i = \sum_{k=1}^{L-2} N_k(L-1-k)$$

which is maximized when $N_1 \geq N_2 \geq \ldots \geq N_{L-1}$.

Figure 3C:
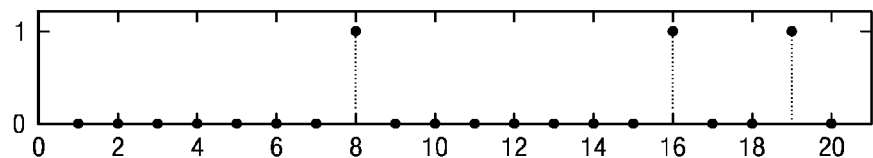
Figure 3D:
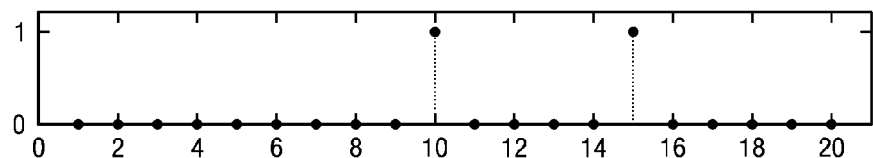
Figure 3E:
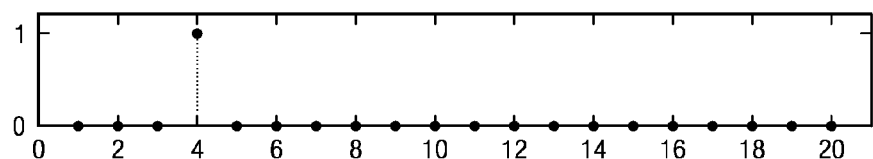
Figure 4A:
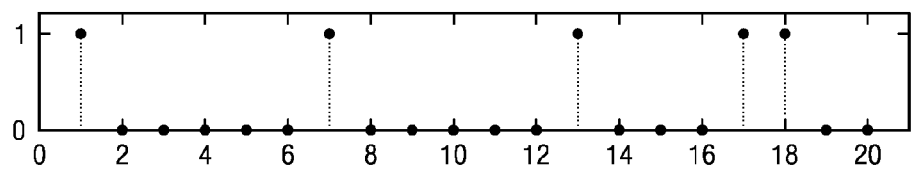
Figure 4B:
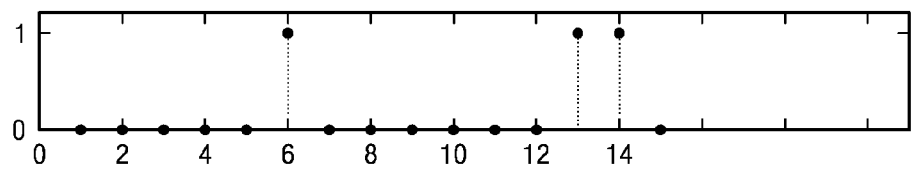
Figure 4C:
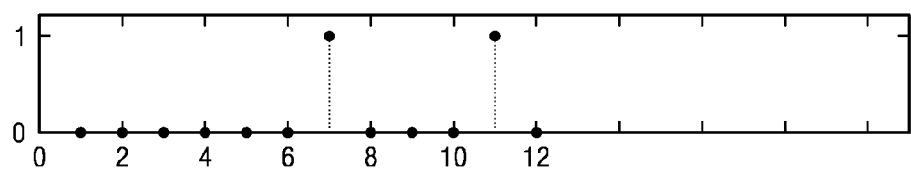
Figure 4D:
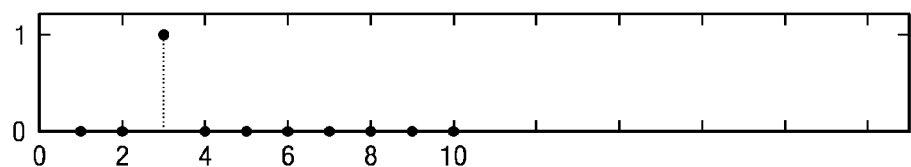

FIGS. 4A-4D show an example of the generation of the L−1 reduced-length coding vectors $z_k$ from the interim coding vectors $c_k$ of FIGS. 3B-3E. The $z_1$ coding vector of FIG. 4A is equivalent to the interim coding vector $c_1$ in FIG. 3B. The reduced-length coding vector $z_2$ of FIG. 4B is formed by removing the five non-zero locations in $c_1$ from the interim coding vector $c_2$ of FIG. 3C. The reduced-length vector $z_3$ of FIG. 4C is then formed by removing the eight non-zero locations in $c_1$ and $c_2$ from $c_3$ in FIG. 3D. This process continues until all L−1 reduced-length coding vectors are generated. As such, due to the removal of non-zero elements in prior vectors, vectors z1 through z4 as shown in FIG. 4A-D may be decreasing in number of locations. Vectors z1 through z4 also may have the locations renumbered so that they all start at 1 and are sequential. Vector z1 may contain 20 locations. Vector c1, of FIG. 3B, may contain five non-zero values, for example, at locations 1, 7, 13, 17, and 18. Therefore, in such an embodiment, vector z2 will contain 15 locations (i.e. locations 20−5). In one embodiment, Vector z2 is formed by removing locations 1, 7, 13, 17, and 18 from c2, as shown in FIG. 3C. Thus, the reduced vector z2, shown in FIG. 4B, may consist of fifteen locations, i.e. 2-6, 8-12, 14-16, and 19-20 of vector c2. These locations may be renumbered such that vector z2 has locations 1-15. To form vector z3, shown FIG. 4C, the non-zero locations of vectors c1 and c2 may be removed from vector c3, of FIG. 3D. Since vector c1 may have five non-zero values at locations, i.e. 1, 7, 13, 17, and 18, and since vector c2 may have three non-zero values at, i.e. 8, 16, and 19, there will be eight (5+3) locations removed, and vector z3 of FIG. 4C may have twelve (20−8) locations, consisting of the remaining locations, i.e. 2-6, 9-12, 14-15, and 20. Vector z3 may be formed by selecting those remaining locations from vector c3, and renumbering the locations. In such an embodiment, vector z3 would have locations 1-12. Vector z4 of FIG. 4D may be formed by removing the non-zero locations of vectors c1, c2, and c3 from vector c4 of FIG. 3E. As such, vector c1 may have five non-zero values at locations, i.e. 1, 7, 13, 17, and 18, and since vector c2 may have three non-zero values at, i.e. 8, 16, and 19, and since vector c3 may have two non-zero values at locations, i.e. 10 and 15, there will be 10 (5+3+2) locations removed and vector z4 of FIG. 4D may have ten (20−10) locations, consisting of the remaining locations, i.e. 2-6, 9, 11-12, 14, and 20. Vector z4 may be formed by selection the remaining locations from vector c4 of FIG. 3E and renumbering the locations to 1-10.

Referring again to FIG. 2, in some embodiments of the invention, as an alternative to calculating interim coding vectors $c_k$ and the coding vectors $z_k$, the vector of the N samples is directly decomposed into reduced-length coding vectors $s_k$ computed as follows. Let $s_1$=s; the reduced-length coding vectors $s_k$, k=2, ..., L−1, may be computed as follows:

set m=1
for each n=1, ..., $D_{k-1}$
  if $s_{k-1}(n) \neq v_{k-1}$
    then $s_k(m)=s_{k-1}(n)$ and m=m+1

Note that the reduced-length coding vectors $z_k$ and the reduced-length coding vectors $s_k$ have the same length, $D_k$, and that the locations in the coding vectors $z_k$ which contain 1 are the locations in the coding vectors $s_k$ which contain $v_k$. Thus, encoding the locations of the $v_k$ values in the coding vectors $s_k$ is equivalent to encoding the locations of 1's in the coding vectors $z_k$.

The resulting coding vectors, i.e., the coding vectors $z_k$ or the coding vectors $s_k$ are then encoded along with an appropriate indication of the reference data value $v_0$ and the coding order used in generating the coding vectors (210) and inserted into the output bit stream. Any suitable encoding technique may be used to encode the coding vectors. Further, an encoding technique may be selected for each coding vector. That is, several encoding techniques may be available for use and the encoding technique that provides the best compression for a particular coding vector may be selected for that coding vector. For example, the coding vectors $z_k$ contain a series of zeros and ones, and there are many known techniques for encoding such vectors, such as run-length coding methods like Golomb or Rice encoding. However, for a particular coding vector $z_k$, run-length coding may not be optimum. When the number of non-zero elements $N_k$ is small, explicit encoding of the $N_k$ locations may result in a fewer number of bits. In this encoding technique, the number of non-zero locations $N_k$ and the locations themselves may be encoded using binary representation or other known pulse-coding techniques. In other cases, $N_k$ may be such that encoding $z_k(n)$ as binary bits may be more efficient than either run-length or explicit location encoding. Accordingly, the technique(s) used to encode the coding vectors $z_k$ may be defined by a particular application, resources available, signal characteristics and performance required.

In some embodiments of the invention, three encoding techniques are provided to be selected for encoding the coding vectors $z_k$, Rice run-length encoding, explicit location encoding, and binary encoding. Further, whenever for some k there are no occurrences of a particular value $v_k$, an indicator of a zero vector, $z_k=0$, is encoded in the output bit stream. The Rice run-length method encodes the length of segments between the occurrences of ones in a coding vector $z_k$ (which in essence defines the locations of all occurrences of a value $v_k$). Compression is maximized by determining the Rice exponent for each $z_k$ to be encoded. The Rice exponent is the power of two used in the Rice run-length encoding technique. In one or more embodiments, a search for the best exponent in the range of one to four is performed, and the exponent that provides the best compression is selected. The selected Rice exponent is encoded in the bit stream followed by the run-length encoding of the coding vector $z_k$.

Explicit location encoding may be used to improve compression when the number of non-zero elements $N_k$ in a coding vector $z_k$ is small. In this case, compression may be achieved by a straightforward encoding of a location offset within the coding vector. In one or more embodiments, if $N_k \leq 4$, explicit location encoding is used. In this case, the number of locations $N_k$ is encoded in the output bit stream followed by the offsets of each of the locations. Since the length of a coding vector $z_k$ is $D_k$, binary encoding of each location may be done in $\lceil \log_2(D_k) \rceil$ bits. In some embodiments of the invention, if the number of bits needed to run length encode a coding vector $z_k$ is greater than $D_k$, binary encoding is used. The binary coding technique writes the $D_k$ bits of the coding vector $z_k$ into the output bit stream. For each of these encoding techniques, an identifier of the selected encoding technique is also inserted in the output bit stream prior to the encoding bits of the coding vector $z_k$.

In some embodiments of the invention, three encoding techniques are provided to be selected for encoding the coding vectors $s_k$, Rice run-length encoding (with four possible exponents), explicit location encoding, and binary encoding. Further, whenever for some k there are no occurrences of a particular value $v_k$, an indicator of a zero vector, $z_k=0$, is encoded in the output bit stream. One possible indicator of a zero vector is shown in Table 2 below. When one of these coding techniques is selected for encoding a coding vector $s_k$, an indicator of the selected coding technique is inserted in the output bit stream prior to the encoding bits of the coding vector $s_k$. One set of possible indicators for the coding techniques is shown in Table 2 below.

TABLE 2

| Encoding | Bit stream sequence |
|---|---|
| Binary encoding | 000 |
| Run length Rice encoding (S = 1) | 001 |
| Run length Rice encoding (S = 2) | 010 |
| Run length Rice encoding (S = 3) | 011 |
| Run length Rice encoding (S = 4) | 100 |
| Value not occurring | 101 |
| Unused | 110 |
| Explicit location encoding | 111 |

In some embodiments of the invention, if the number of bits needed to run-length encode the locations of $v_k$ in a coding vector $s_k$ is greater than $D_k$, then binary encoding is used. Specifically, $D_k$ bits are written into the output bit stream, where binary 1's and 0's are written when $s_k(n)=v_k$ and $s_k(n) \neq v_k$, respectively, with $n=0, \ldots, D_k-1$.

In some embodiments of the invention, Rice run length encoding is used to encode the locations of $v_k$ in a coding vector $s_k$ if the number of bits required to encode the segment lengths between the occurrences of $v_k$ within the $s_k(n)$ sequence (which in essence defines the locations of all occurrences of values $v_k$ provides the best compression. Rice parameters over the range of one to four are tried, and the one that provides the best compression is selected. If Rice run length coding provides the best compression, then the coding vector $s_k$ is run length encoded in the output bit stream.

In some embodiments of the invention, if binary encoding is not used and $1 \leq N_k \leq 4$ and the number of bits needed to run-length encode the locations of $v_k$ a coding vector $s_k$ is greater than $N_k \lceil \log_2(D_k) \rceil + 2$, then explicit location encoding is used. The $N_k$ locations $l_k(m)$ of $v_k$ are determined such that $s_k(l_k(m))=v_k$, for $m=0, \ldots, N_k-1$. The binary value of $N_k-1$ is encoded in the output bit stream in two bits and then the $N_k$ indices $l_k(m)$ are written to the output bit stream with $\lceil \log_2(D_k) \rceil$ bits each.

Referring again to FIG. 2, the steps 200-210 are repeated (212) for each frame in the digital signal that is to be encoded using lossless value-location encoding. As is explained in more detail below in reference to FIG. 5, lossless value-location encoding may be used in combination with other methods for compressing digital signals. In such embodiments, the lossless value-location encoding may be selected for encoding some frames in the digital signal and other encoding methods may be used for other frames in the digital signal. Criteria for determining when lossless value-location encoding is used in preference to other coding methods may depend on the application. For example, lossless value-location encoding may be used whenever the number of possible distinct data values to encode, L, is within some desired range, or when the minimum and maximum values of a frame are within a desired range, or whenever else the signal is expected to be efficiently encoded by this method.

In some embodiments of the invention, lossless value-location encoding is selected according to criteria empirically determined by statistical analysis of relevant test signals. More specifically, lossless value-location encoding is used when $L \leq 4$ and the maximum and minimum data values are in one of four desired ranges. The frame length N is also considered for one of the four desired ranges. Table 3 below summarizes these selection criteria. If the data values in the frame meet one of the criteria in specified Table 3 and the most frequently occurring data value in the frame is 0, then lossless value-location encoding is used for the frame with the reference data value $v_0=0$. If lossless value-location encoding is used, an indicator of the specific criteria met is written into the output stream, i.e., one of the values in the column of Table 3 labeled "Bit stream sequence."

TABLE 3

| L | $L_{min}$ | $L_{max}$ | Frame length | Data-range case | Bit stream sequence |
|---|---|---|---|---|---|
| 4 | −2 | 1 | 240, 320 | 0 | 00 |
| 3 | −1 | 1 | All | 1 | 01 |
| 3 | −2 | 0 | All | 2 | 10 |
| 2 | 0 | 1 | All | 3 | 11 |

In the above method, the mapping of the possible distinct data values to the coding order $v_k$ impacts the achievable maximum compression of the N samples. Encoding a vector first that has a larger number of elements $N_k$ may require more bits to encode the locations of the $v_k$, but more elements may be removed in the generation of subsequent coding vectors. On the other hand, encoding a coding vector with a smaller number of elements before one with a larger number of elements may require fewer bits, but fewer elements may be removed in the generation of subsequent coding vectors.

Further, the value determined for the reference data value $v_0$ and/or the coding order $v_k$ affects the achievable maximum compression. For example, some choices of the reference data value $v_0$ and the coding order $v_k$ may required the explicit encoding of the reference data value and each of the $v_k$. If $B_v$, bits are required to encode one value, then $LB_v$ bits are needed to encode the $v_0$ and $v_k$ values. If the values in the frame are such that values are within some small offset of a particular value of $v_0$ and $B_o$ bits are required to specify this offset, with $B_o < B_v$, then the $v_0$ and the $v_k$ offsets may be encoded in $B_v + (L-1)B_o$ bits.

Encoding efficiency may be further improved if a known relationship between the $v_k$ values exists, so that mapping of the remaining possible data values to the $v_k$ may be done in a pre-determined order. For example, if the $v_0$ and $v_k$ values are mapped sequentially from the minimum to maximum data values, then $v_0$ may be encoded with all other $v_k$ being explicitly known. In general, it is desirable that the choice of the reference data value $v_0$ and the coding order $v_k$ is made such that when combined with encoding of the code vectors, maximum coding efficiency is achieved.

Figure 5:
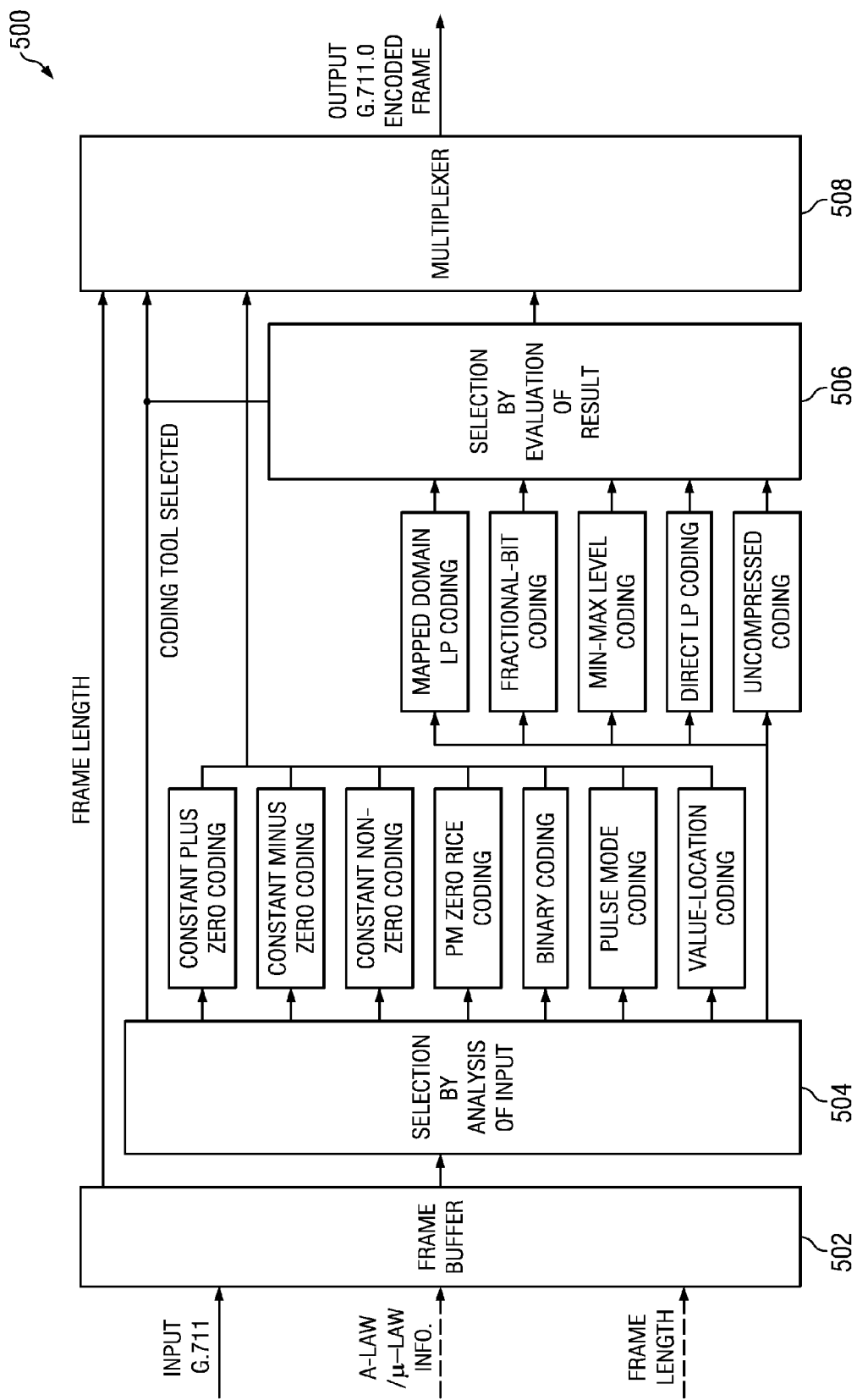
FIG. 5 shows a block diagram of an audio encoder in accordance with one or more embodiments of the invention.

FIG. 5 shows a block diagram of an audio encoder (500), e.g., the audio encoder (106) of FIG. 1, configured to perform lossless value-location encoding in accordance with one or more embodiments of the invention. More specifically, FIG. 5 shows a high level block diagram of the ITU-T G.711.0 audio encoder for illustrative purposes. The audio encoder (500) includes a frame buffer (502), two coding tool selection components (504, 506), twelve coding tools, and a multiplexer (508). The audio encoder (500) receives G.711 audio frames in the frame buffer (502). The frame size N may be 40, 80, 160, 240, or 320 samples. Each frame is then provided to input selection component (504).

The input selection component (504) may select one of seven encoding tools, i.e., the three constant coding tools, the PM zero Rice coding tool, the binary coding tool, the pulse mode coding tool, and the value-location coding tool, to which it is connected for encoding the frame based on an analysis of the audio frame and/or determine that the frame should be encoded by one of the five other coding tools, i.e., the mapped domain LP coding tool, the fractional-bit coding tool, the min-max level coding tool, the direct LP coding tool, and the uncompressed coding tool. The outputs of the latter five coding tools are provided to output selection component (506) which selects the best output of the five coding tools by analyzing the results of the coding tools. The output selection component (506) may not require a complete encoding by each of the five coding tools, but rather may estimate the resulting encoded frame sizes and select one of the coding tools for performing the actual encoding based on the estimates. The multiplexer (508) selects which coding tool bit stream to output: the bit stream of the coding tool selected by the input selection component (504) or the bit stream of the coding tool selected by the output selection component (506).

The coding techniques provided by each of the coding tools are described in ITU-T G.711.0. Further, the fractional-bit coding tool may provide a coding technique as described in co-pending U.S. patent application Ser. No. 12/818,164, entitled "Method and System for Block Adaptive Fractional-Bit Per Sample Encoding, filed on Jun. 18, 2010, which is incorporated by reference herein in its entirety. The coding technique described in ITU-T G.711.0 for the value-location coding tool is an embodiment of the method for lossless value-location encoding of FIG. 2. In the described embodiment, the value-location coding tool is selected according to the criteria shown in Table 3 above and when the most frequently occurring data value in a frame is 0. When selected, the value-location coding tool assumes that the reference data value $v_0$ is 0 and determines the coding order $v_k$ using the previously describing alternating technique. Further, the N samples in the frame are decomposed into coding vectors $s_k$ as previously described, and are selectively encoded using one of Rice run-length encoding, explicit location encoding, or binary encoding as previously described.

In one or more embodiments of the invention, the value-location coding tool may provide coding functionality in accordance with one or more other embodiments of the method of FIG. 2. For example, interim coding vectors $c_k$ may be computed and then reduced in length to generate reduced-length coding vectors $z_k$. Further, different techniques may be used to determine the reference data value $v_0$ and/or the coding order $v_k$.

Embodiments of the methods and encoders described herein may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). Any included software may be initially stored in a computer-readable medium such as compact disc (CD), a diskette, a tape, a file, memory, or any other computer readable storage device and loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Figure 6:
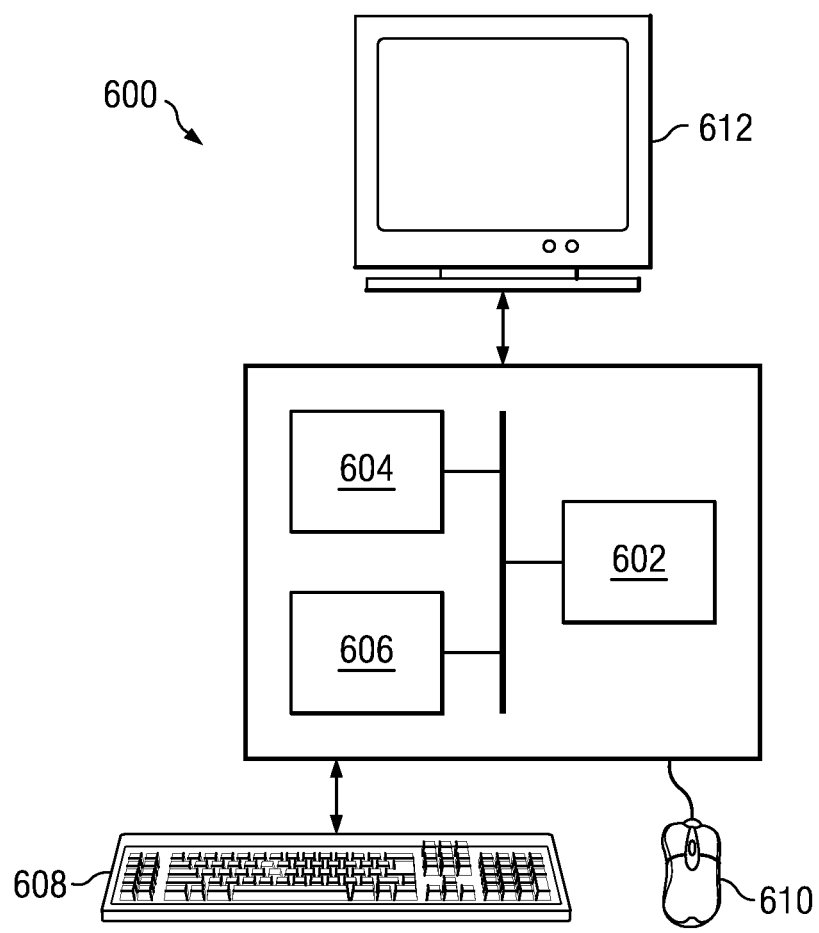
FIG. 6 shows an illustrative digital system in accordance with one or more embodiments of the invention.

Embodiments of the methods and encoders for lossless value-location encoding as described herein may be implemented for virtually any type of digital system (e.g., a desk top computer, a laptop computer, a handheld device such as a mobile (i.e., cellular) phone, a personal digital assistant, a Voice over Internet Protocol (VOIP) communication device such as a telephone, server or personal computer, etc.) with functionality to capture or otherwise generate digital signals. FIG. 6 shows a block diagram of an illustrative digital system (600) (e.g., a personal computer) that includes a processor (602), associated memory (604), a storage device (606), and numerous other elements and functionalities typical of digital systems (not shown). In one or more embodiments of the invention, the digital system (600) may include multiple processors and/or one or more of the processors may be digital signal processors.

The digital system (600) may also include input means, such as a keyboard (608) and a mouse (610) (or other cursor control device), and output means, such as a monitor (612) (or other display device). The digital system (600) may also include an audio capture device (not shown) that includes circuitry (e.g., a microphone) for capturing audio sequences. The digital system (600) may include an audio encoder, e.g., the encoder of FIG. 5, with functionality to perform embodiments of the method of FIG. 2 as described herein. The digital system (600) may be connected to a network (not shown) (e.g., a local area network (LAN), a wide area network (WAN) such as the Internet, a cellular network, any other similar type of network and/or any combination thereof) via a network interface connection (not shown). Those skilled in the art will appreciate that the input and output means may take other forms.

Further, those skilled in the art will appreciate that one or more elements of the aforementioned digital system (600) may be located at a remote location and connected to the other elements over a network. Further, embodiments of the invention may be implemented on a distributed system having a plurality of nodes, where each portion of the system and software instructions may be located on a different node within the distributed system. In one embodiment of the invention, the node may be a digital system. Alternatively, the node may be a processor with associated physical memory. The node may alternatively be a processor with shared memory and/or resources.

Software instructions to perform embodiments of the invention may be stored on a computer readable medium such as a compact disc (CD), a diskette, a tape, a file, memory, or any other computer readable storage device. The software instructions may be distributed to the digital system (600) via removable computer readable media (e.g., floppy disk, optical disk, flash memory, USB key), via a transmission path from computer readable media on another digital system, etc.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims. It is therefore contemplated that the appended claims will cover any such modifications of the embodiments as fall within the true scope and spirit of the invention.

What is claimed is:

1. A method of encoding samples in a digital signal, the method comprising:
    receiving a frame of N samples of the digital signal;
    determining L possible distinct data values in the N samples;
    determining a reference data value in the L possible distinct data values and a coding order of L−1 remaining possible distinct data values, wherein each of the L−1 remaining possible distinct data values is mapped to a position in the coding order;
    decomposing the N samples into L−1 coding vectors based on the coding order, wherein each coding vector identifies the locations of one of the L−1 remaining possible distinct data values in the N samples, wherein decomposing the N samples comprises computing L−1 interim coding vectors based on the coding order, wherein an interim coding vector includes a first value at locations where the one of the L−1 remaining possible distinct data values occurs and a second value in all other locations and computing the L−1 coding vectors in the coding order from the L−1 interim coding vectors.

2. The method of claim 1, wherein a coding vector of the L−1 coding vectors is equivalent to an interim coding vector of the L−1 interim coding vectors with data values corresponding to locations having the first value in at least one previous interim coding vector removed.

3. The method of claim 1, wherein decomposing the N samples comprises:
    computing L−1 coding vectors, wherein an initial coding vector of the L−1 coding vectors consists of the N samples, and a subsequent coding vector of the L−1 coding vectors is generated by removing all occurrences of one or more data values in the coding order from the initial coding vector.

4. The method of claim 1, wherein the coding order is determined by alternating assignment of the L−1 remaining possible data values to the coding order based on whether a remaining possible data value is above or below the reference data value.

5. The method of claim 4, wherein the reference data value is 0.

6. The method of claim 1, wherein encoding the L−1 coding vectors comprises selecting an encoding technique for at least one of the L−1 coding vectors.

7. The method of claim 6, wherein the encoding technique is one selected from a group consisting of Rice run-length encoding, explicit location encoding, and binary encoding.

8. The method of claim 1, wherein encoding the L−1 coding vectors comprises encoding an indicator when a possible distinct data value in the L possible distinct data values is not found in the N samples.

9. An encoder for encoding a digital signal, the encoder comprising:
    a frame buffer configured to receive a frame of N samples of the digital signal; and
    a value-location coding component implemented in a hardware configured to encode the frame by
        determining L possible distinct data values in the N samples;
        determining a reference data value in the L possible distinct data values and a coding order of L−1 remaining possible distinct data values, wherein each of the L−1 remaining possible distinct data values is mapped to a position in the coding order;
        decomposing the N samples into L−1 coding vectors based on the coding order, wherein each coding vector identifies the locations of one of the L−1 remaining possible distinct data values in the N samples;
        encoding the L−1 coding vectors; and
    wherein the value-location coding component is further configured to decompose the N samples by computing L−1 interim coding vectors based on the coding order, wherein an interim coding vector includes a first value at locations where the one of the L−1 remaining possible distinct data values occurs and a second value in all other locations and computing the L−1 coding vectors in the coding order from the L−1 interim coding vectors.

10. The encoder of claim 9, wherein a coding vector of the L−1 coding vectors is equivalent to an interim coding vector of the L−1 interim coding vectors with data values corresponding to locations having the first value in at least one previous interim coding vector removed.

11. The encoder of claim 9, wherein the value-location coding component is further configured to decompose the N samples by
    computing L−1 coding vectors, wherein an initial coding vector of the L−1 coding vectors consists of the N samples, and a subsequent coding vector of the L−1 coding vectors is generated by removing all occurrences of one or more data values in the coding order from the initial coding vector.

12. The encoder of claim 9, wherein the coding order is determined by alternating assignment of the L−1 remaining possible data values to the coding order based on whether a remaining possible data value is above or below the reference data value.

13. The encoder of claim 9, wherein the value-location coding component is configured to encode the L−1 coding vectors by selecting an encoding technique from a plurality of encoding techniques for at least one of the L−1 coding vectors, wherein the plurality of encoding techniques comprises Rice run-length encoding, explicit location encoding, and binary encoding.

14. A digital system configured to encode samples in a digital signal, the digital system comprising:

means for receiving a frame of N samples of the digital signal;

means for determining L possible distinct data values in the N samples;

means for determining a reference data value in the L possible distinct data values and a coding order of L−1 remaining possible distinct data values, wherein each of the L−1 remaining possible distinct data values is mapped to a position in the coding order;

means for decomposing the N samples into L−1 coding vectors based on the coding order, wherein each coding vector identifies the locations of one of the L−1 remaining possible distinct data values in the N samples, wherein the means for decomposing the N samples is configured to compute L−1 interim coding vectors based on the coding order, wherein an interim coding vector includes a first value at locations where the one of the L−1 remaining possible distinct data values occurs and a second value in all other locations and compute the L−1 coding vectors in the coding order from the L−1 interim coding vectors; and means for encoding the L−1 coding vectors.

15. The digital system of claim 14, wherein the means for decomposing the N samples is configured to compute L−1 coding vectors, wherein an initial coding vector of the L−1 coding vectors consists of the N samples, and a subsequent coding vector of the L−1 coding vectors is generated by removing all occurrences of one or more data values in the coding order from the initial coding vector.

16. The digital system of claim 14, wherein the coding order is determined by alternating mapping of the L−1 remaining possible data values to positions in the coding order based on whether a remaining possible data value is above or below the reference data value.

17. The digital system of claim 14, wherein the means for encoding is configured to encode the L−1 coding vectors by selecting an encoding technique from a plurality of encoding techniques for each of the L−1 coding vectors.

\* \* \* \* \*